United States Patent [19]

Yamaguchi et al.

[11] Patent Number: 4,707,371
[45] Date of Patent: Nov. 17, 1987

[54] PROCESS FOR PREPARING DRIED PRE-GELATINIZED CEREAL GRAIN

[75] Inventors: Noriaki Yamaguchi, Jyouyou; Shozo Sugano, Nara; Kayo Enomoto, Suita, all of Japan

[73] Assignee: House Food Industrial Company Limited, Higashiosaka, Japan

[21] Appl. No.: 829,073

[22] Filed: Feb. 13, 1986

[30] Foreign Application Priority Data

Feb. 26, 1985 [JP] Japan .................................. 60-37116

[51] Int. Cl.$^4$ .......................... A23L 1/10; A23L 1/182
[52] U.S. Cl. ..................................... 426/462; 426/508
[58] Field of Search ............... 426/508, 509, 510, 640, 426/618–621, 627, 450, 459, 460, 461, 462, 463

[56] References Cited

U.S. PATENT DOCUMENTS

| | | | |
|---|---|---|---|
| 570,209 | 2/1959 | Ozai-Durrani | 426/508 |
| 2,937,946 | 5/1960 | Ozai-Durrani | 426/508 |
| 3,086,867 | 4/1963 | Miller | 426/461 |
| 3,408,202 | 10/1968 | Serbia et al. | 426/461 |

Primary Examiner—Raymond N. Jones
Assistant Examiner—Marianne M. Cintins
Attorney, Agent, or Firm—Oblon, Fisher, Spivak, McClelland, & Maier

[57] ABSTRACT

This invention provides a process for preparing dried pre-gelatinized cereal grain, in particular for instant food, which make it possible to obtain dried pre-gelatinized cereal grain that can be rapidly reconstituted with hot water and that has better taste after reconstitution with hot water than other dried grain materials. The process for preparing dried pre-gelatinized cereal grain involves subjecting pre-gelatinized grain to both high temperature water-immersing treatment and low temperature water-immersing treatment so as to adjust the water content thereof to between 73 and 84 weight % and then drying it.

9 Claims, No Drawings

PROCESS FOR PREPARING DRIED PRE-GELATINIZED CEREAL GRAIN

BACKGROUND OF THE INVENTION

(1) Field of the Invention

The present invention relates to a process for preparing dried pre-gelatinized cereal grain such as pre-gelatinized rice, which enables use of the grain as an instant food (a light quickly prepared food).

In particular, the present invention relates to such a process, which makes it possible to obtain pre-gelatinized cereal grain that is rapidly reconstituted with hot water and that has better taste after reconstitution with hot water than other dried grain materials.

(2) Description of the Prior Art

Many kinds of noodles packed in cups have been sold as a dried instant food which can be eaten after easy and rapid reconstitution with hot water. On the other hand, many studies have been conducted on cereal grains, such as rice, which are hard to make into instant food. For example, Japanese Patent Pre-examined Publication (KOKAI) No. 105243/1977 discloses a process for preparing instant rice comprising the steps of adjusting the water content of washed rice to 30-40%; steaming it; fully unbinding the steamed rice particles form each other by immersing them into water; removing the water therefrom; adjusting the water content of the rice to 56-65% by steaming and immersing in water; charging the rice into a container; and subjecting the container to pressing and heating.

Japanese Patent Pre-examined Publication (KOKAI) No. 151471/1981 also discloses a process for preparing dried instant rice comprising the steps of pre-gelatinizing rice at a water content of 65 to 85%; adjusting the water content to 50-80% by leaving the rice at a temperature of 25° to 80° C. for longer than 30 minutes; and then drying the rice. Japanese Patent Pre-examined Publication (KOKAI) No. 151472/1981 futher discloses a process for preparing dried instant rice comprising the steps of pre-gelatinizing rice at a water content of 50 to 65%; increasing the water content by more than 10%; leaving the rice having a water content of 50 to 80% at a temperature of 25° to 80° C. for longer than 30 minutes; and then drying the rice.

However, when the dried rice obtained by the above-mentioned methods is reconstituted with hot water, the rice thus reconstituted is still poor in taste; glutinosity, texture, smell, and reconstitution properties.

SUMMARY OF THE INVENTION

Under such circumstances, the present inventors made various studies and found by subjecting pergelatinized grain to two steps of specific water-immersing treatment so as to adjust the water content of the grain to 73 to 84 weight %, and then drying the grain there can be obtained dried grain having better taste, smell and reconstitution properties than conventional dried grain.

It is, therefore, a primary object of the present invention to provide dried pre-gelatinized cereal grain having better taste, smell and reconstitution properties than conventional dried grain.

Another object of this invention is to provide dried pre-gelatinized grain suitable for heating and cooking by a microwave oven.

These and other objects of this invention will be clear from the following description.

In accordance with the present invention, there is provided a process for preparing dried pre-gelatinized cereal grain, which comprises subjecting pre-gelatinized grain to a high temperature water-immersing treatment at a temperature of 50° to 85° C. followed by a low temperature water-immersing treatment at a temperature of 15° to 30° C. so as to adjust the water content thereof to between 73 and 84 weight %; and then drying it.

DESCRIPTION OF THE PREFERRED EMBODIMENTS

The cereal grains to which this invention can be applied include rice, in particular nonglutinous rice, barley and the like. Any rice, no matter where produced, hard rice, soft rice, new rice and old rice can be used as the rice in this invention. As for barley, there can be used processed barley such as barley pressed after refining, polished barley, rice-shaped barley and the like. Rice-shaped barley is especially preferred. At any rate, the process of this invention can be applied to all cereal grains, but an especially good effect can be obtained when the process is applied to refined grains such as refined rice and refined barley.

At the first stage, the cereal grain is pre-gelatinized by a known method. In this connection, it is preferable to immerse the washed grain into water of a temperature of 25° to 35° C. for 50 to 180 minutes to adjust the water content thereof to 25-40%, in particular to 28-35%, before the above-mentioned pre-gelatinizing treatment. A mixture of water and seasoning liquid, seasoning liquid alone, and coloring liquid can also be employed as the water (i.e. liquid) for the immersion. In this case, an aqueous solution containing salt, sugar, sweet sake, soy sauce and other seasonings can be used as the seasoning liquid.

The pre-gelatinizing treatment can also be conducted by other methods, for example, by ordinary heat treatment using an electric rice-cooker, by pressed rice-cooking method, etc.

In particular, it is preferable to cook (or steam) rice at a temperature of 95° to 130° C. for 10 to 60 minutes. On the other hand, it is also preferable to cook barley at a temperature of 110° to 130° C. for 12 to 50 minutes because it is more difficult to pre-gelatinize the starch of barley than that of rice. In the above pre-gelatinizing treatment, it is preferable to employ the pressed rice-cooking method which enables the pre-gelatinizing of grain in a short time, in order to make the texture of the grain softer and to obtain good reconstitution with hot water. However, for pre-gelatinization of cereal grain, it is not necessary to pre-gelatinize all of the starch contained in the cereal grain.

In the above pre-gelatinizing treatment, it is desirable to adjust the water content of the grain to 60-72%. This is because the reconstituted grain is hard and it is difficult to reconstitute the core of the grain if the water content of the grain is less than 60%. On the other hand, the reconstituted grain becomes too soft to maintain its shape if the water content of the grain is more than 72%. For cooking, it is preferable to use an amount of water equal to 1.2 to 2.4 times the weight of the grain.

The most important treatment according to this invention is that of subjecting the pre-gelatinized grain obtained by the above method to two steps of water-immersing treatment. In the first step, i.e., the high temperature water-immersing treatment, the pre-gelatinized grain is immersed in 50° to 85° C. water. In this connection, it is preferable to keep the grain in the water for 5 to 25 minutes, more preferably at a temperature of 55° to 65° C. for 7 to 13 minutes. This high temperature water-immersing treatment adjusts the water content of the grain to 73 to 84% in a short time. Accordingly, it is not preferable to keep the grain in the water for too long because this will cause a large amount of pre-gelatinized starch to be dissolved out, degrading the smell and taste of the product.

The second step of the treatment, i.e., the low temperature water-immersing treatment, is carried out at a temperature of 15° to 30° C. In this case, it is preferable to keep the grain in the water for 15 to 25 minutes. This low temperature treatment is carried out in order to distribute the water absorbed by the grain during the high temperature water-immersing treatment uniformly through the pre-gelatinized grain. Therefore, by combination of the high and low temperature water-immersing treatments desirable water content and uniformity thereof are obtained in a short time and degradation of the taste and smell of the grain is kept to the minimum. In the aforesaid first and second steps of water immersing treatment, the amount of matter used is not particularly limited but it is preferable to employ an amount of water equal to 2 to 3 times the weight of the grain so as to prevent adhesion of the cereal grain particles.

In the above water-immersing treatment, it is also important to adjust the water content of the grain to 73-84%. This is because the water absorption ability of the dried grain becomes bad upon reconstitution with hot water, and the grain reconstituted with hot water has a hard texture with a hard core when a grain having a water content of less than 73% is dried. On the other hand, the grain reconstituted becomes too soft and lacks glutinosity when a grain having a water content of more than 84%, preferably between 76 and 79%, is dried. It is also more effective to adjust the water content of the grain treated by the two water-immersing treatments to 110–130% by weight of water content of the pre-gelatinized grain prior to such water immersing treatments. This is because the softness and taste of the reconstituted grain are improved.

In the process of this invention, unbinding treatment can be carried out after the water-immersing treatments. This unbinding treatment is conducted to prevent lowering of drying efficiency and of the reconstitution properties of the dried grain by adhesion of the grain particles to each other during drying. The treatment is usually conducted after removing water from the grain immersed in water, but it may be conducted by a water jet treatment (by spraying water on the grain particles) during water-immersing treatments.

In the next stage, the pre-gelatinized cereal grain is dried after the water-immersing treatments. Although various drying methods can be employed, it is preferable to employ the usual hot-air drying method.

Specifically, the drying treatment is conducted at a temperature of 75° to 90° C., 20 to 45 RH% for 60 to 240 minutes, more preferably at a temperature of 75° to 85° C., 20 to 30 RH% for 60 to 100 minutes. Employing such conditions, i.e., drying at high temperature and low humidity for a short period leads to small cracks forming on the cereal grain particles so that water absorption properties are increased upon reconstitution with hot water. On the other hand, where freeze drying is employed, the constitution of the cereal grain becomes porous so that the texture of the grain after reconstitution decreases slightly.

It is preferable to dry cereal grain so the grain has a water content of 6 to 13% after drying. This is because large cracks are produced in the cereal grain particles so the grain particles are easily broken; also, of lowers the water absorption properties of the grain at reconstitution if the grain is dried so the water content thereof is less than 6%, whereas if it is dried so the water content thereof is more than 13%, storability is degraded. Where the cereal grain particles are unbound from each other before drying, and a method such as vibration is applied to the grain particles during drying, it is not particularly necessary to unbound the coagulated grain particles from each other after drying. However, where such methods are not employed and dried grain particles are adhered to each other, it is desirable to unound the grain particles from each other by an unbinding treatment so as to improve reconstitution properties and appearance of the grain particles.

According to a process of this invention, shape, taste and smell of the raw cereal grain can be fully maintained in the dried grain, and there can be obtained dried pre-gelatinized cereal grain having good reconstitution properties. That is, the reconstituted grain compares with the grain cooked by conventional method. Therefore, dried pre-gelatinized cereal grain prepared according to a process of this invention is preferably used, for example, as rice charged in a cup wherein water is poured in the cup and it is subjected to only heating for several minutes by a microwave oven ready it for eating. Such dried cereal grain is also widely used as instant foods in which the required amount of heated water is poured on the dried grain in the container, it is left to stand for several minutes with the lid on, the excess amount of hot water is removed therefrom, and it is reconstituted by leaving it to steam it for several minutes, or the dried grain is reconstituted by being boiled in the pan, thereby readying the reconstituted grain for eating.

Embodiments of the present invention will be described hereinunder with examples, although these examples do not limit the invention.

EXAMPLE 1

200 g of refined rice (nonglutinous rice; water content of 14%) was washed with water, and the water content of the rice was adjusted to 30.8% by immersion into 30° C. water. Total weight of the rice and water was then adjusted to 500 g by adding water thereto and the rice cooked at a temperature of 105° C. for 20 minutes under pressure, thereby obtaining pre-gelatinized rice having a water content of 66.8%. At the next stage, the pre-gelatinized rice was subjected to water-immersing treatment (the conditions are shown in Table 1), the water removed therefrom, the rice unbound, (spreading the grain on a tray for drying and spraying, showering water thereon), after which it was dried by hot-air at a temperature of 75° C., 25 RH% for 90 minutes, thereby obtaining dried pre-gelatinized rice having a water content of 6.7%.

80 g of the dried pre-gelatinized rice obtained was charged in a cylindrical container made of paper and 150 ml of water was further added thereto, after which the container was covered with a lid. The container was put in a microwave oven and was then heated for 5 minutes by microwaves (500 W). Thereafter, the container was covered and left to stand for 5 minutes to uniformalize distribution of water content in the presence of steam. Characteristics of resulting rice were determined.

Characteristics of dried pre-gelatinized rice obtained by various water-immersing condition and conditions of water-immersing treatment are shown in Table 1. The characteristics of pre-gelatinized rice were determined by the following organoleptic test, using rice cooked by conventional method as a control. In this connection, the control was obtained by the following steps: 1.4 kg of refined rice as used in example 1 was washed with water, and thereafter 2.1 l of water at a temperature of 30° C. was added thereto. The rice was then left to stand for 1 hour, after which it was cooked for 30 minutes by an electric rice cooker. The cooked rice was further left to stand for 10 minutes in the rice cooker to obtain the control (rice).

The organoleptic test

Cooked rice or reconstituted rice was evaluated based on the following standard by a panel of 10 members; the mean resulting evaluation was employed. In this case, evaluation of control was set to zero.

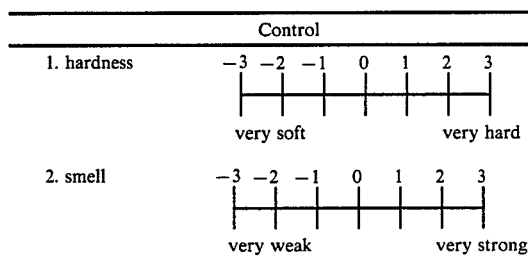

TABLE I

| | | immersing condition | | | organoleptic test | | | | |
|---|---|---|---|---|---|---|---|---|---|
| | Process | temperature (°C.) | time (minutes) | water content after immersion (%) | hardness | smell | glutinosity | shape | Total evaluation |
| Comparative example | One step immersing method | 20 | 90 | 73.4 | 2.5 | −1.2 | −2.1 | −0.6 | very hard, lack of smell and glutinosity |
| | | 40 | 60 | 77.3 | 0.4 | −2.3 | −1.5 | −2.3 | good texture, weak smell and bad shape |
| | | 60 | 30 | 78.0 | −0.2 | −0.2 | −1.4 | −1.5 | weak smell, no taste |
| | | 80 | 30 | 86.0 | −2.4 | −2.4 | −2.0 | −2.5 | too soft, weak smell less taste |
| | Two steps immersing method | 20 / 60 | 20 / 10 | 74.2 | 1.8 | −0.5 | −0.6 | −2.1 | hard texture, many grain particles are broken |
| | | 40 / 20 | 15 / 20 | 75.1 | −0.9 | −0.2 | −0.3 | −0.2 | central portion of the grain particle is hard, surface |
| | | 60 / 10 | 10 / 25 | 76.1 | 0.7 | −0.6 | −0.2 | −0.1 | slightly hard, good shape bad taste |
| | | 60 / 30 | 10 / 15 | 77.4 | −0.6 | −0.5 | −0.3 | −0.3 | slightly soft, glutinousious, weak smell, less taste |
| | | 87 / 20 | 5 / 20 | 77.1 | −0.9 | −0.5 | −0.7 | −0.4 | slightly soft, less glutinosity less taste |
| Example of this invention | | 50 / 20 | 15 / 20 | 77.1 | 0.3 | −0.2 | −0.3 | −0.2 | slightly hard, glutinousious, good shape, good smell |
| | | 60 / 15 | 10 / 25 | 77.0 | 0.2 | −0.2 | −0.1 | −0.1 | slightly hard, glutinousious, good smell, good tastes |
| | | 60 / 20 | 10 / 20 | 77.5 | 0.1 | −0.2 | −0.2 | −0.1 | soft, glutinousious good smell, good taste |
| | | 60 / 25 | 10 / 15 | 77.0 | −0.1 | −0.1 | −0.2 | −0.1 | slightly soft, good glutinousity, good smell good taste |
| | | 60 / 20 | 20 / 20 | 78.5 | 0 | −0.2 | −0.1 | −0.2 | slightly soft, glutinousious good smell, good taste |
| | | 83 / 20 | 5 / 20 | 76.4 | 0.2 | −0.2 | −0.3 | −0.2 | slightly hard, less glutinousious good smell, good taste |

EXAMPLE 2

200 g of barley (water content 13%) was immersed in water for 1 hour and 440 ml of water was added thereto. The resulting mixture was cooked at a temperature of 125° C. for 15 minutes under pressure, and thereby pre-gelatinized barley having a water content of 67% was obtained. The pre-gelatinized barley was immersed in water at a temperature of 60° C. for 10 minutes, and at a temperature of 20° C. for 20 minutes in order to adjust the water content thereof to 76.2%, after which the water was removed from the barley and the resulting barley was subjected to unbinding treatment.

Dried pre-gelatinized barley having water content of 6.3% was then obtained by drying it under 26 RH% for 90 minutes.

Using the resulting dried barley and the dried pre-gelatinized rice which was obtained according to the process of example 1 wherein pre-gelatinized rice was immersed in water at a temperature of 60° C. for 10 minutes and at a temperature of 20° C. for 20 minutes in the 2 steps of water-immersing treatments, the following food material for seasoned rice in milk was prepared.

| Composition: | |
|---|---|
| dried pre-gelatinized rice | 70 g |
| dried pre-gelatinized rice shaped barley | 10 g |
| dried shrimp | 5 g |
| seasoning agent containing salt, sodium glutamate and the like | 2 g |

150 ml of milk was added to the above composition which was then cooked in a microwave oven according to the method described in example 1. This provided seasoned rice in milk having good taste and smell.

What is claimed is:

1. A process for preparing dried pre-gelatinized cereal grain, which comprises subjecting pre-gelatinized cereal grain to a high temperature water-immersing treatment for 5 to 25 minutes at a temperature of 50° to 85° C. followed by a low temperature water-immersing treatment for 15 to 25 minutes at a temperature of 15° to 30° C. so as to adjust the water content thereof to between 73 and 84 weight %; and then drying the resulting cereal grain.

2. A process as set forth in claim 1 wherein the pre-gelatinized cereal grain has a water content of 60 to 72 weight %.

3. A process as set forth in claim 1 wherein dried pre-gelatinized grain has a water content of 6 to 13 weight %.

4. A process as set forth in claim 1 wherein the cereal grain particles are unbound from each other during the water-immersion treatments.

5. A process as set forth in claim 1 wherein the cereal grain particles are unbound from each other after the water-immersion treatments.

6. A process as set forth in claim 1 wherein the pre-gelatinized grain is a cereal grain selected from the group consisting of rice and barley.

7. A process as set forth in claim 1 wherein the grain is dried at a temperature of 75° to 90° C., 20 to 45 RH% for 60 to 240 minutes by hot-air drying.

8. A process as set forth in claim 1 wherein there is used, as the pre-gelatinized grain, pre-gelatinized rice obtained by cooking at a temperature of 95° to 130° C. for 10 to 60 minutes.

9. A process as set forth in claim 1 wherein there is used, as the pre-gelatinized grain, pre-gelatinized barley obtained by cooking at a temperature of 110° to 130° C. for 20 to 50 minutes.

* * * * *